United States Patent
Frincke et al.

(10) Patent No.: US 7,484,484 B2
(45) Date of Patent: Feb. 3, 2009

(54) CYLINDER DEACTIVATION APPARATUS INCORPORATING A DISTRIBUTED ACCUMULATOR

(75) Inventors: Donn A. Frincke, Davison, MI (US); Mark Stabinsky, Troy, MI (US); William C. Albertson, Clinton Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 114 days.

(21) Appl. No.: 11/375,427

(22) Filed: Mar. 14, 2006

(65) Prior Publication Data

US 2007/0215081 A1    Sep. 20, 2007

(51) Int. Cl.
*F01L 1/34* (2006.01)
(52) U.S. Cl. ............... 123/90.16; 123/90.52; 123/90.43
(58) Field of Classification Search ............. 123/90.16, 123/90.52, 90.43
See application file for complete search history.

(56) References Cited

U.S. PATENT DOCUMENTS

| 4,584,976 | A | * | 4/1986 | Hillebrand | ............... 123/90.55 |
| 4,886,022 | A | * | 12/1989 | Nakai | ............... 123/90.17 |
| 6,755,162 | B1 | * | 6/2004 | Marriott | ............... 123/90.13 |

FOREIGN PATENT DOCUMENTS

EP    1143120 A2 * 10/2001

* cited by examiner

*Primary Examiner*—Zelalem Eshete

(57) ABSTRACT

A variable displacement internal combustion engine having a cylinder block and a cylinder head attached thereto. The variable displacement internal combustion engine includes at least one switching hydraulic lash adjuster. A lash adjuster oil feed passage is at least partially defined by one of the cylinder block and the cylinder head. The lash adjuster oil feed passage is operable to communicate pressurized oil to the at least one switching hydraulic lash adjuster. A distributed accumulator is disposed within the lash adjuster oil feed passage and operates to attenuate oil pressure spikes within the lash adjuster oil feed passage.

24 Claims, 3 Drawing Sheets

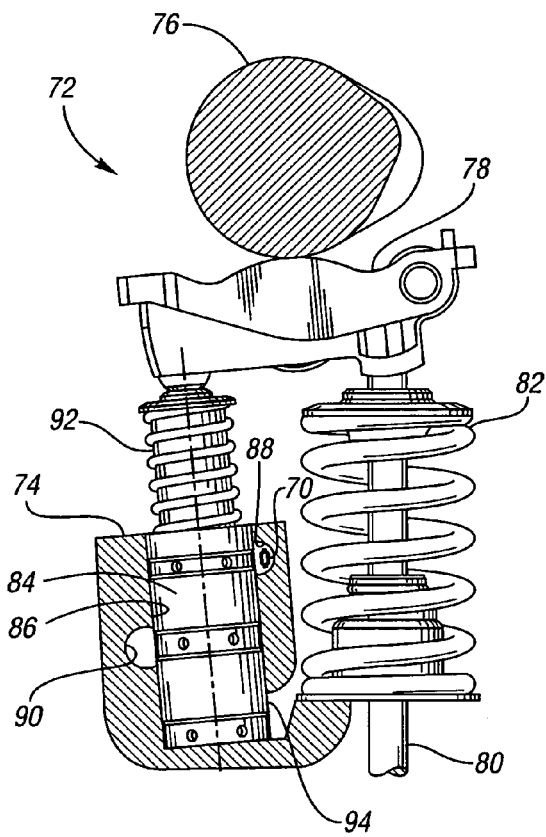
FIG. 4
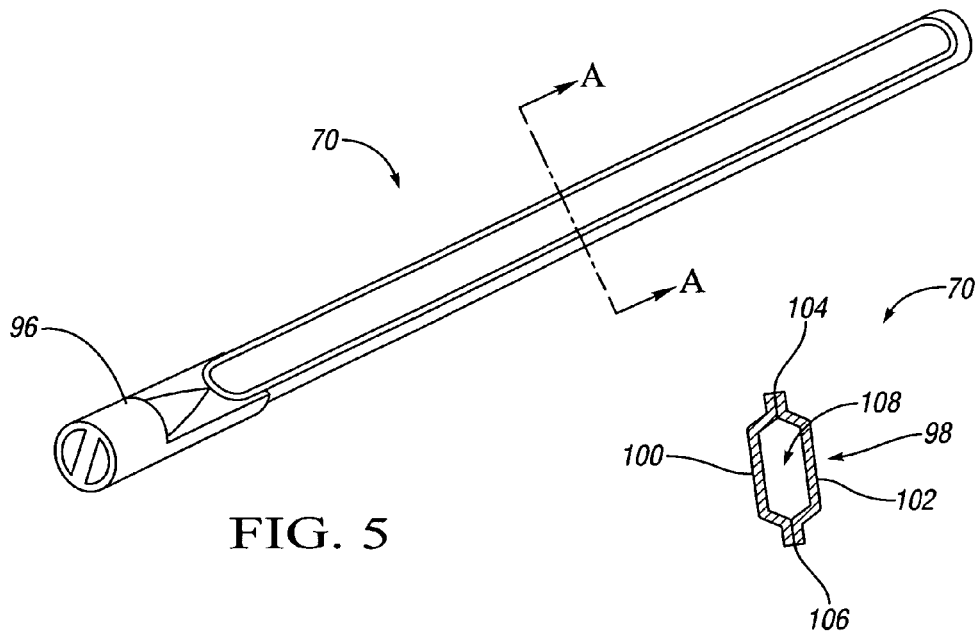
FIG. 5
FIG. 5a

CYLINDER DEACTIVATION APPARATUS INCORPORATING A DISTRIBUTED ACCUMULATOR

TECHNICAL FIELD

The present invention relates to a hydraulically actuated cylinder deactivation apparatus for an internal combustion engine and more specifically to a cylinder deactivation apparatus that incorporates a distributed accumulator to attenuate pressure pulses within a lash adjuster oil feed passage.

BACKGROUND OF THE INVENTION

Variable displacement internal combustion engines provide improved fuel economy and torque on demand by operating on the principle of cylinder deactivation. During operating conditions that require high output torque, every cylinder of a variable displacement internal combustion engine is supplied with fuel and air. Alternately, during operating conditions at low speed, low load, and/or other inefficient conditions for a fully displaced internal combustion engine, cylinders may be deactivated to improve the fuel economy of a vehicle equipped with the variable displacement internal combustion engine. For example, in operating a vehicle equipped with an eight cylinder variable displacement internal combustion engine, fuel economy will be improved if only four cylinders of the internal combustion engine are operated during relatively low torque operating conditions by reducing throttling losses. Throttling losses, also known as pumping losses, are the extra work that an internal combustion engine must perform to pump air from the relatively low pressure of an intake manifold, across intake and exhaust valves, and out to the atmosphere. The deactivated cylinders will disallow airflow across their respective intake and exhaust valves, thereby reducing pumping losses by forcing the internal combustion engine to operate at a higher intake manifold pressure. Since the deactivated cylinders do not allow gas to flow, additional losses are avoided by operating the deactivated cylinders as "gas springs" due to the compression and decompression of the gases trapped within each deactivated cylinder.

It is known in the art of engine cylinder deactivation to provide switchable hydraulic lash adjusters operable to either actuate the valves of a deactivatable cylinder or to maintain the valves in a closed position through lost motion features of the hydraulic lash adjusters. This lost motion occurs when the hydraulic lash adjusters telescope within a body or sleeve thereby allowing the respective intake or exhaust valve to remain closed even while the camshaft is rotating. Similar mechanisms may be provided within a hydraulic valve lifter, which includes a hydraulic lash adjusting mechanism and so may be referred to broadly as a hydraulic lash adjuster. A mechanical latching device, such as a locking pin, responsive to hydraulic fluid pressure is typically provided within the hydraulic lash adjusters to enable lost motion.

Hydraulic lash adjusters are supplied with pressurized oil through a lash adjuster oil feed gallery or passage to annular feed grooves, which provide oil pressure to take up the lash in the valve train between the tip of intake and exhaust valves and their associated rocker arm or other-actuator, such as, for example a roller finger follower. Hydraulic lash adjusters that are configured to effect cylinder deactivation typically have an additional hydraulic port, which connects through feed passages with a valved pressurized oil supply, to communicate fluid to the locking pin. A solenoid-actuated hydraulic control valve may be used to selectively communicate oil pressure from a main source of pressurized oil to the locking pin via a feed passage to effect cylinder deactivation. Alternatively, the solenoid-actuated hydraulic control valve operates to exhaust oil pressure from the locking pin and feed passage.

The smooth operation of the locking pin may be influenced by oil pressure excursions or spikes within the lash adjuster oil feed passage. The locking pin typically requires a small amount of lash, such that the locking pin can freely shuttle between the lost motion and activated valve opening modes. To ensure an adequate amount of lash to enable movement of the locking pin, a predetermined force, typically from a spring member, is employed to oppose the forces imposed on the locking pin by the hydraulic lash adjuster. Additional components, such as variable camshaft phasers, are typically actuated via the same pressurized oil circuit that feeds the lash adjuster oil feed passage. The actuation of these additional components may cause short term high oil pressure excursions that are outside the expected average range within the lash adjuster oil feed passage. This high oil pressure excursion may cause what is typically termed "lifter pump-up", wherein the higher than expected oil pressure within the lash adjuster oil feed passage urges the hydraulic lash adjuster to overcome the force of the spring bias thereby eliminating the lash required to enable smooth operation of the locking pin.

SUMMARY OF THE INVENTION

Accordingly, a variable displacement internal combustion engine is provided having a cylinder block and a cylinder head attached thereto. The variable displacement internal combustion engine includes at least one switching hydraulic lash adjuster and a lash adjuster oil feed passage at least partially defined by one of the cylinder block and the cylinder head. The lash adjuster oil feed passage operates to communicate pressurized oil to the at least one switching hydraulic lash adjuster. Additionally, a distributed accumulator is disposed within the lash adjuster oil feed passage. The distributed accumulator operates to attenuate oil pressure spikes within the lash adjuster oil feed passage.

The distributed accumulator may span substantially the entire length of the lash adjuster oil feed passage. Furthermore, the distributed accumulator may define at least one compliant pocket filled with a compressible fluid. The switching hydraulic lash adjuster may be a stationary hydraulic lash adjuster disposed at least partially within the cylinder head or may be a movable hydraulic lash adjuster reciprocally disposed at least partially within the cylinder block.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is a partial cross sectional view of a cylinder head assembly for use with an overhead cam configured internal combustion engine and illustrating a distributed accumulator consistent with the present invention;

FIG. 5 is a perspective view of the distributed accumulator shown in FIGS. 2, 3, and 4; and FIG. 5a is a sectional view of the distributed accumulator taken along line A-A of FIG. 5.

DESCRIPTION OF THE PREFERRED EMBODIMENTS

Figure 1:
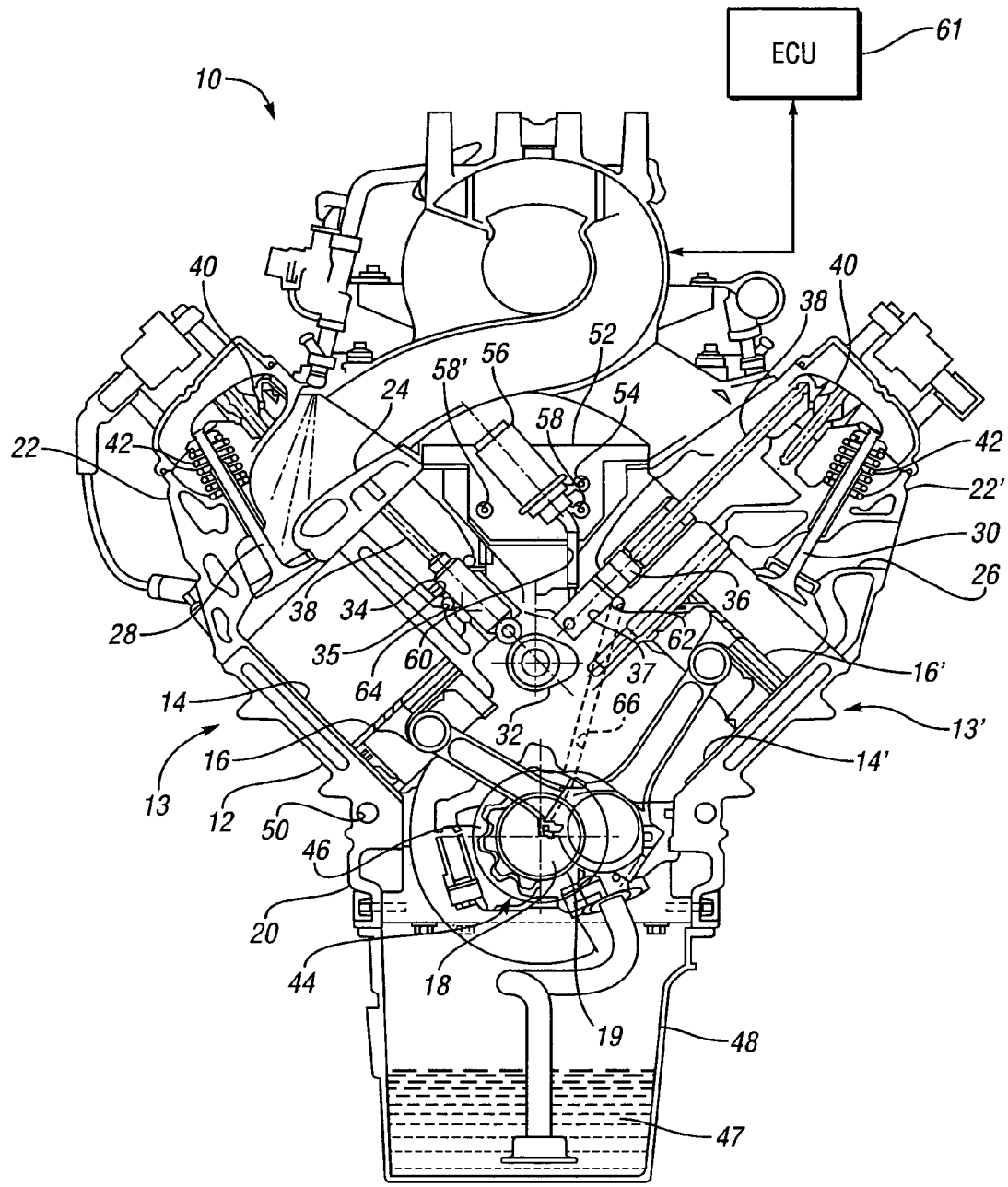
FIG. 1 is a is a rear cross sectional view of an eight cylinder internal combustion engine having a V-type configuration and employing a cylinder deactivation system.

Referring to the drawings wherein like reference numbers correspond to like or similar components throughout the several figures, there is shown in FIG. 1 an internal combustion engine, generally indicated at 10. The engine 10 is an eight cylinder overhead valve engine, however, those skilled in the art will recognize that the engine 10 may have an alternate number of cylinders such as four, six, ten, twelve, or even sixteen arranged in differing configurations while remaining within the scope of that which is claimed. The engine 10 includes a cylinder block 12 having a first and second bank 13 and 13' of cylinders 14 and 14', respectively, arranged in a V-shaped configuration. Each of the cylinders 14 and 14' contain a respective piston 16 and 16' reciprocally movable therein by the rotation of a crankshaft 18. The crankshaft 18 is rotatably supported by main bearings 19 within a crankcase portion 20 of the cylinder block 12. The cylinders 14 and 14' are capped or closed at one end by a respective cylinder head 22 and 22' that define intake ports, such as 24 and exhaust ports, such as 26, each of which is selectively opened to a respective cylinder 14 and 14' by intake and exhaust poppet valves 28 and 30, respectively.

The poppet valves 28 and 30 are actuated by valve actuation mechanisms including a camshaft 32 rotatably driven by the crankshaft 18. The camshaft 32 of engine 10 is disposed within the cylinder block 12, however, those skilled in the art of engine design will recognize that the claimed invention may be used in engines having over head camshaft configurations. The camshaft 32 engages hydraulic valve lifters or movable hydraulic lash adjusters including, both conventional hydraulic lash adjusters, such as 34 and so-called switching hydraulic lash adjusters, such as 36. The hydraulic lash adjusters 34 are reciprocally movable respectively within bores, such as 35, while the switching hydraulic lifters 36 are reciprocally movable respectively within bores, such as 37. The lifters 34 and 36 engage push rods 38, which connect with rocker arms 40 to actuate the valves 28 and 30 against the bias force of valve springs 42.

The engine 10 includes a lubrication and cylinder deactivation control circuit 44, which includes an oil pump 46 that is driven by the crankshaft 18. The oil pump 46 is a positive displacement-type pump that draws oil 47 from a reservoir or oil pan 48 mounted below the crankcase portion 20 of the cylinder block 12. The oil pump 46 supplies pressurized oil to a main passage 50, defined by the cylinder block 12, which operates as a source of pressurized oil.

The engine 10 also includes an oil manifold assembly 52 removably mounted thereto and defining a control passage 54 that receives pressurized oil from the main passage 50. The oil manifold assembly 52 includes solenoid-actuated hydraulic control valves 56 and 56' (shown in FIG. 2) each of which is operable to selectively provide pressurized oil from the control passage 54 to a respective feed passage 58 and 58'. The solenoid-actuated hydraulic control valves 56 and 56' are preferably on/off type valves. Each of the feed passages 58 and 58' are defined by the oil manifold assembly 52 and operate to selectively communicate pressurized oil to the bores 37 of the switching hydraulic lifters 36 via passages, such as 60. The passages 60 are at least partially defined by the oil manifold assembly 52 and the cylinder block 12. An electronic control unit, or ECU 61, is provided in electrical communication with the engine 10. The ECU 61 preferably includes a pre-programmable digital computer, and operates to selectively provide electrical potential to control the operation of the solenoid-actuated hydraulic control valves 56 and 56'.

Figure 2:
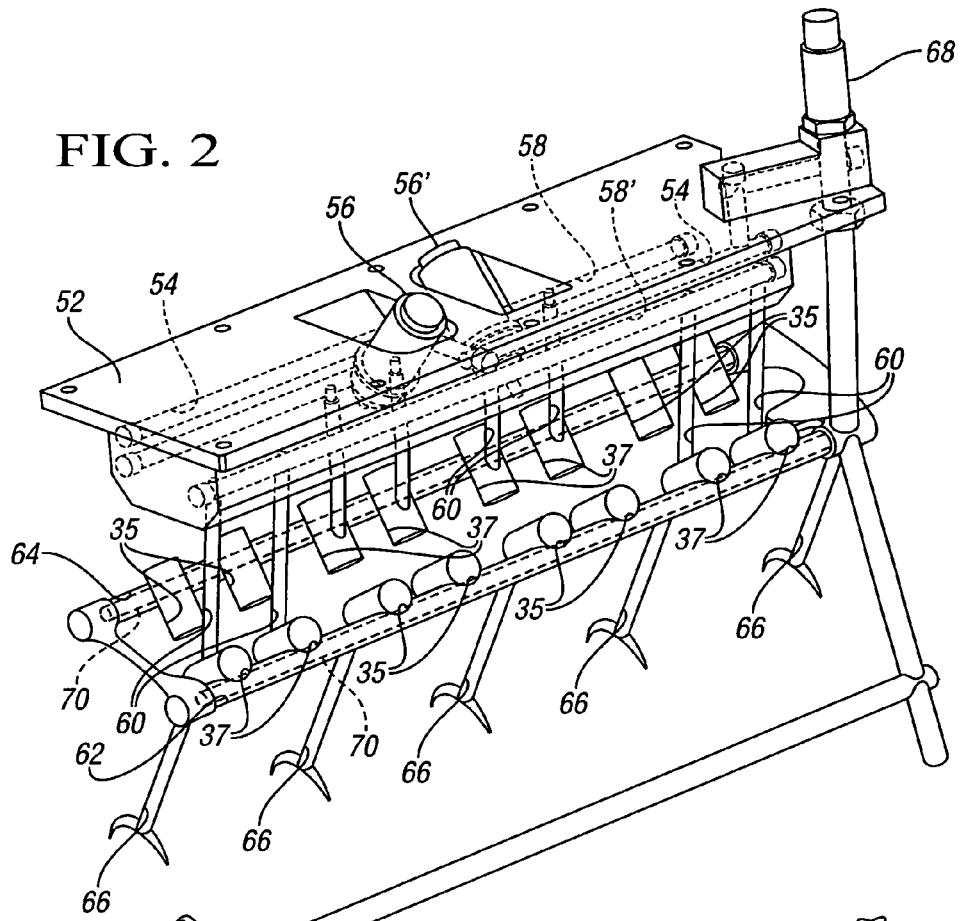
FIG. 2 is a partial schematic perspective view of a lubrication and cylinder deactivation control circuit, for the internal combustion engine shown in FIG. 1, illustrating a distributed accumulator consistent with the present invention.

Referring now to FIG. 2, there is shown a schematic representation of a portion of the lubrication and cylinder deactivation control circuit 44. The main passage 50 communicates pressurized oil directly to lash adjusters oil feed passages 62 and 64, which supply pressurized oil to the lifters 34 and 36, shown in FIG. 1, for actuating lash adjuster mechanisms, not shown, contained therein. The lash adjusters oil feed passage 62 also communicates pressurized oil through a plurality of passages 66 directly to the main bearings 19, shown in FIG. 1, for lubrication. A pressure sensor 68 may be provided in communication with the main passage 50 to provide diagnostic signals to ECU 61, shown in FIG. 1. A distributed accumulator 70 is provided within each of the lash adjuster oil feed passages 62 and 64. The distributed accumulators 70 extend substantially the length of the lash adjuster oil feed passages 62 and 64.

The operation of the engine 10 can best be understood with reference to FIGS. 1 and 2. The rapidly expanding combustion gases within the respective cylinders 14 and 14' drive the reciprocal motion of the pistons 16 and 16'. This reciprocal motion rotates the crankshaft 18 to output a torque from the engine 10. The rotation of the crankshaft 18 drives the oil pump 46 to supply pressurized oil to the lubrication and cylinder deactivation control circuit 44 through the main passage 50. The pressurized oil is utilized to lubricate moving parts within the engine 10 such as, for example, the pistons 16 and 16', camshaft 32, hydraulic lash adjusters 34 and 36, rocker arms 40, and other movable components known to those skilled in the art. The pressurized oil is also utilized to actuate the lash adjuster mechanisms provided within the hydraulic lash adjusters 34 and 36 as well as actuating other hydraulically actuated components of the engine such as, for example, variable camshaft phasers, not shown.

Additionally, the main passage 50 supplies pressurized oil to the control passage 54 within the oil manifold assembly 52. The pressurized oil from within the control passage 54 is selectively communicated to the feed passages 58 and 58' by a respective one of the solenoid-actuated hydraulic control valves 56 and 56'. The pressurized oil, when present within the feed passages 58 and 58', is communicated via the plurality of passages 60 to a respective one of the bores 37. When full displacement, i.e. all cylinders 14 and 14' producing power, is desired, the solenoid-actuated hydraulic control valves 56 and 56' exhaust or de-pressurize the respective feed passages 58 and 58' and the plurality of passages 60. With the plurality of passages 60 de-pressurized, the switching hydraulic lash adjusters 36 remain locked in the operating or activated mode. When deactivation of the cylinders 14 and 14' associated with the switching hydraulic lash adjusters 36 is desired, the ECU 61 commands the solenoid-actuated hydraulic control valves 56 and 56' to open thereby pressurizing the feed passages 58 and 58', respectively, and hence the plurality of passages 60. The pressurized oil unlatches mechanical latching devices, such as locking pins, disposed within the switching hydraulic lash adjusters 36, which allow the lash adjuster mechanisms to telescope within the switching hydraulic lash adjusters 36 and thus disable operation of the poppet valves 28 and 30 in mechanical communication with the switching hydraulic lash adjusters 36. The operation of other hydraulically actuated components may cause high oil pressure excursions or spikes within the lash adjuster oil feed passages 62 and 64. These high oil pressure excursions may cause what is typically termed "lifter pump-up", wherein the high oil pressure within the lash adjuster oil feed passages 62 and 64 biases the lash adjuster mechanism thereby eliminating the lash or clearance required to enable smooth operation to the locking pin of the switching hydraulic lash adjusters 36. This may result in a delay or the inability of the switching hydraulic lash adjusters 36 to enable cylinder deactivation when commanded by the ECU 61. The distributed accumulator 70, shown in FIG. 2, operates to attenuate the high pressure excursions within the lash adjuster oil feed passages 62 and 64 thereby enabling accurate control of the switching hydraulic lifters 36. One possible construction of the distributed accumulator 70 is discussed in greater detail hereinafter with reference to FIGS. 5 and 5a.

By deactivating half of the eight cylinders 14 and 14' of the engine 10 during low torque demand modes of engine operation, the operating efficiency of the engine 10 may be improved. Additionally, it is preferred that every other cylinder 14 and 14' within the firing sequence of the engine 10 be deactivated such that engine balance is maintained.

Figure 3:
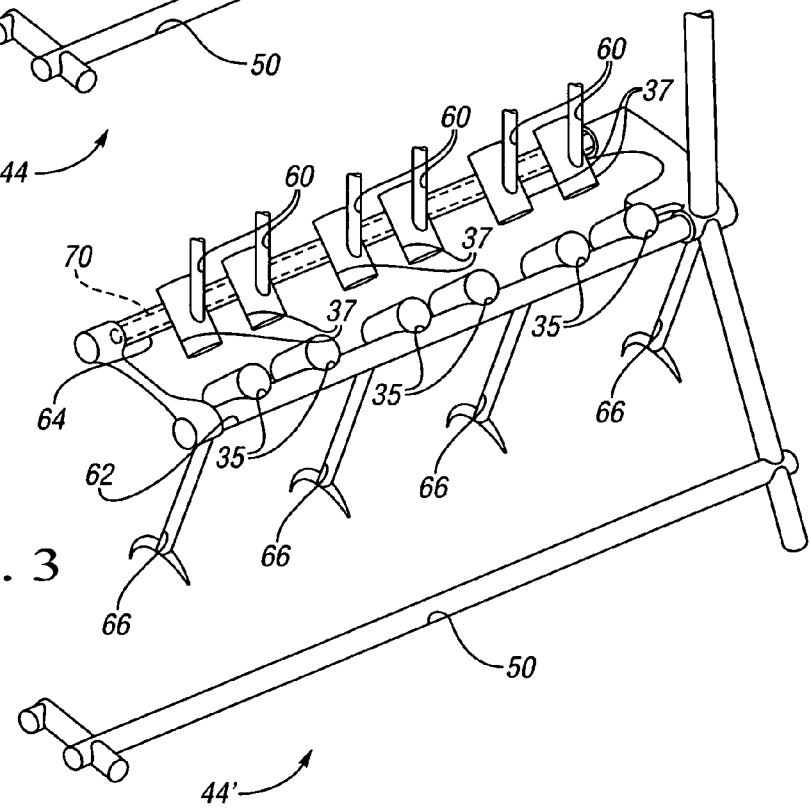
FIG. 3 is a partial schematic perspective view of a lubrication and cylinder deactivation control circuit, for a six cylinder internal combustion engine having a V-type configuration and illustrating a distributed accumulator consistent with the present invention.

With reference to FIG. 3, there is shown a partial schematic perspective view of a lubrication and cylinder deactivation control circuit 44', for a six cylinder internal combustion engine having a V-type configuration. With a typical six cylinder V-type engine configuration one bank of three cylinders are selectively deactivatable. Therefore, the lash adjuster oil feed passage 64 communicates pressurized oil to switching hydraulic lash adjusters 36, shown in FIG. 1, contained in bores 37, while the lash adjuster oil feed passage 62 communicates pressurized oil to conventional hydraulic lash adjusters 34, shown in FIG. 1, contained in bores 35. Since only the lash adjuster oil feed passage 64 is in communication with the switching hydraulic lash adjusters 36, a distributed accumulator 70 is provided therein. Those skilled in the art will recognize that the distributed accumulator 70 may also be provided within the lash adjuster oil feed passage 62 to attenuate high oil pressure excursions; however, the attenuation of the high oil pressure excursions within lash adjuster oil feed passage 62 is less critical than those in the lash adjuster oil feed passage 64.

FIG. 4 illustrates a partial cross sectional view of a portion of a cylinder head assembly 72 for use with engines having an overhead camshaft valvetrain configuration. The cylinder head assembly 72 includes a cylinder head 74 having a camshaft 76 rotatably mounted thereto. The camshaft engages a roller finger follower 78 which operates to selectively open a poppet valve 80 against the bias of a valve spring 82. The poppet valve 80 and the valve spring 82 are similar to the poppet valves 28 and 30, shown in FIG. 1, and the valve spring 42, shown in FIG. 1, in both construction and design. A selectively deactivatable or switching stationary hydraulic lash adjuster 84 engages the roller finger follower 78 at an end opposite the poppet valve 80. The hydraulic lash adjuster 84 is disposed within a bore 86, which is defined by the cylinder head 74.

A lash adjuster oil feed passage 88 operates to communicate oil to the hydraulic lash adjuster 84 to maintain proper lash or clearance within the valvetrain. A passage 90 is defined by the cylinder head 74 and operates to selectively communicate pressurized oil to the hydraulic lash adjuster 84 to effect deactivation or lost motion of the hydraulic lash adjuster 84. In the deactivated mode, a lash adjuster portion 92 telescopes within a body 94 of the hydraulic lash adjuster 84 to enable lost motion. In the preferred embodiment the roller finger follower 78 is a two-step design, that is, the roller finger follower 78, in concert with the camshaft 76 provides two distinct valve lift profiles to the poppet valve 80 in response to step changes in oil pressure within the lash adjuster oil feed passage 88. For this reason, as well as the fact that the hydraulic lash adjuster 84 is selectively deactivatable, oil pressure variations or fluctuations within the lash adjuster oil feed passage 88 should be minimized. To this end, the distributed accumulator 70 is provided within the lash adjuster oil feed passage 88 to attenuate oil pressure spikes.

FIG. 5 illustrates a perspective view of an exemplary distributed accumulator 70, as shown in FIGS. 2 through 4. The distributed accumulator 70 is sufficiently configured to be positioned in the lash adjuster oil feed passages 62 and 64, shown in FIGS. 1-3, and lash adjuster oil feed passages 88, shown in FIG. 4. The distributed accumulator 70 provides a compliant-membrane that contains a compressible fluid. The distributed accumulator 70 has the affect of reducing the apparent bulk modulus of oil within the lash adjuster oil feed passages 62, 64, and 88, thereby reducing the sensitivity of the switching hydraulic lash adjusters 36 and 84, shown in FIG. 1 and FIG. 4 respectively, to oil pressure excursions or spikes within these passages during switching from an active state or mode to a deactivated mode. Furthermore, due to the distributed nature of the distributed accumulator 70, i.e., due to the fact that the compliant membrane extends along the length of the lash adjuster oil feed passages 62, 64, and 88, the pressure sensitivity to flow oscillations between a series of switching hydraulic lash adjusters 36 or 84 along these hydraulic passages is also reduced. As a result, the flow effects of one of the hydraulic lash adjusters 36 or 84 on neighboring hydraulic lash adjusters 36 or 84 are minimized. The distributed accumulator 70 includes an attachment portion 96 sufficiently configured to secure the distributed accumulator 70 within the respective lash adjuster oil feed passages 62, 64, and 88.

FIG. 5a illustrates a cross sectional view of an exemplary structure for the distributed accumulator 70 taken along line A-A of FIG. 5. The distributed accumulator 70 includes a pocket 98, which extends substantially the length of the accumulator 70, as shown in FIG. 5. The pocket 98 is formed by first and second membranes 100 and 102, which are welded together at the perimeters 104 and 106 to form a hermetically sealed internal chamber 108 to receive a compressible fluid, such as nitrogen, air, helium, etc. The membranes 100 and 102 are preferably stainless steel having a thickness of 0.008" (0.2 mm). Alternatively, the membranes 100 and 102 may comprise other metals or elastomeric polymers that have the requisite chemical resistance, strength, and fatigue resistance.

The geometry of the membranes 100 and 102 are optimally designed to produce a desired apparent bulk modulus of the oil, while providing an absolute maximum volumetric distortion that is in excess of the normal fluid volumetric variations of the oil. In other words, the membranes 100 and 102 are designed to be highly compliant, but preferably not collapse against each other under high pressure conditions. In addition, preferably the yield strength of the membranes 100 and 102 will not be exceeded during high oil pressure excursions. Further, the spring rate of the membranes 100 and 102 along with the compressibility of the fluid within the chamber 108 are selected to provide an overall compliance within a desired range. It may be desirable to design the geometry of the membranes 100 and 102 to alter the load distribution through the membranes when the maximum expected volumetric flow variation and/or pressure is exceeded so that the membrane material never plastically deforms.

It is contemplated that the compressible fluid within the internal chamber 108 may be pre-charged or pre-pressurized. This may be achieved by welding the membranes 100 and 102 together inside a pressurized fluid filled chamber such that the pressurized fluid is trapped within the chamber 108. Alternative methods may include crimping, roll-forming, and extruding.

While the best modes for carrying out the invention have been described in detail, those familiar with the art to which this invention relates will recognize various alternative designs and embodiments for practicing the invention within the scope of the appended claims.

The invention claimed is:

1. A variable displacement internal combustion engine having a cylinder block and a cylinder head attached thereto, the variable displacement internal combustion engine comprising:
   at least one switching hydraulic lash adjuster;
   a lash adjuster oil feed passage at least partially defined by one of the cylinder block and the cylinder head, said lash adjuster oil feed passage being operable to communicate pressurized oil to said at least one switching hydraulic lash adjuster;
   a distributed accumulator disposed within said lash adjuster oil feed passage, said distributed accumulator being operable to attenuate oil pressure spikes within said lash adjuster oil feed passage; and
   a control valve to control actuation of said at least one switching hydraulic lash adjuster, wherein a control passage communicates pressurized oil to said control valve.

2. The variable displacement internal combustion engine of claim 1, wherein said distributed accumulator extends substantially the length of said lash adjuster oil feed passage.

3. The variable displacement internal combustion engine of claim 1, wherein said at least one switching hydraulic lash adjuster is a stationary hydraulic lash adjuster disposed at least partially within the cylinder head.

4. The variable displacement internal combustion engine of claim 1, wherein said at least one switching hydraulic lash adjuster is a movable hydraulic lash adjuster reciprocally disposed at least partially within the cylinder block.

5. The variable displacement internal combustion engine of claim 1, wherein said distributed accumulator defines at least one compliant pocket filled with a compressible fluid.

6. The variable displacement internal combustion engine of claim 5, wherein said at least one compliant pocket comprises a stainless steel membrane.

7. The variable displacement internal combustion engine of claim 1, wherein said distributed accumulator includes an attachment portion sufficiently configured to secure said distributed accumulator within said lash adjuster oil feed passage.

8. The variable displacement internal combustion engine of claim 1, wherein said at least one switching hydraulic lash adjuster is a lost motion device.

9. An internal combustion engine comprising:
   a plurality of switching hydraulic lash adjusters;
   a cylinder block defining a plurality of cylinders at least one of said plurality of cylinders being selectively deactivatable by said plurality of switching hydraulic lash adjusters;
   at least one cylinder head mounted with respect to said cylinder block;
   at least one lash adjuster oil feed passage at least partially defined by one of said cylinder block and said at least one cylinder head, said at least one lash adjuster oil feed passage being operable to communicate pressurized oil to at least one of said plurality of switching hydraulic lash adjusters;
   at least one distributed accumulator disposed within said at least one lash adjuster oil feed passage, said at least one distributed accumulator being operable to attenuate oil pressure spikes within said at least one lash adjuster oil feed passage; and
   a control valve to control actuation of said at least one of said plurality of switching hydraulic lash adjusters, wherein a control passage communicates pressurized oil to said control valve.

10. The internal combustion engine of claim 9 further comprising:
    at least one camshaft rotatably mounted with respect to said cylinder block; and
    wherein said at least one camshaft is operable to directly engage said plurality of plurality of switching hydraulic lash adjusters to effect movement thereof.

11. The internal combustion engine of claim 9 further comprising:
    at least one camshaft rotatably mounted with respect to said at least one cylinder head; and
    at least one roller finger follower having an end in engagement with at least one poppet valve;
    wherein said at least one camshaft engages said at least one roller finger follower to selectively open said least one poppet valve;
    wherein at least one of said plurality of switching hydraulic lash adjusters engages said at least one roller finger follower at an end opposite said at least one poppet valve; and
    wherein at least one of said plurality of switching hydraulic lash adjusters is a stationary hydraulic lash adjuster mounted with respect to said at least one cylinder head.

12. The internal combustion engine of claim 11, wherein said at least one roller finger follower is a two-step roller finger follower.

13. The internal combustion engine of claim 11, wherein said plurality of switching hydraulic lash adjusters does not contact a surface of the at least one camshaft.

14. The internal combustion engine of claim 9, wherein said distributed accumulator defines at least one compliant pocket filled with a compressible fluid.

15. The internal combustion engine of claim 14, wherein said at least one compliant pocket comprises a stainless steel membrane.

16. The internal combustion engine of claim 9, wherein said distributed accumulator includes an attachment portion sufficiently configured to secure said distributed accumulator within said at least one lash adjuster oil feed passage.

17. The internal combustion engine of claim 9, wherein each switching hydraulic lash adjuster of said plurality is a lost motion device.

18. An internal combustion engine having a cylinder block and a cylinder head attached thereto, the internal combustion engine comprising:
    at least one hydraulic lash adjuster;
    at least one lash adjuster oil feed passage at least partially defined by one of the cylinder block and the cylinder head, said at least one lash adjuster oil feed passage being operable to communicate pressurized oil to said at least one hydraulic lash adjuster;
    at least one distributed accumulator disposed within said at least one lash adjuster oil feed passage, said at least one distributed accumulator being operable to attenuate oil pressure spikes within said at least one lash adjuster oil feed passage; and a control valve to control actuation of said at least one hydraulic lash adjuster, wherein a control passage communicates pressurized oil to said control valve.

19. The internal combustion engine of claim 18, wherein said at least one hydraulic lash adjuster is a switching hydraulic lash adjuster.

20. The internal combustion engine of claim 19, wherein said at least one switching hydraulic lash adjuster is a movable hydraulic lash adjuster reciprocally disposed at least partially within the cylinder block.

21. The internal combustion engine of claim 19, wherein said at least one switching hydraulic lash adjuster is a stationary hydraulic lash adjuster disposed at least partially within the cylinder head.

22. The internal combustion engine of claim 18, wherein said at least one distributed accumulator extends substantially the length of said at least one lash adjuster oil feed passage.

23. The variable displacement internal combustion engine of claim 18, wherein said at least one distributed accumulator defines at least one compliant pocket filled with a compressible fluid.

24. The internal combustion engine of claim 18, wherein said at least one hydraulic lash adjuster is a lost motion device.

* * * * *